US012543707B2

(12) United States Patent
Martoni

(10) Patent No.: US 12,543,707 B2
(45) Date of Patent: Feb. 10, 2026

(54) LAYING NEST PROVIDED WITH AN IMPROVED EJECTION SYSTEM

(71) Applicant: VALLI S.R.L., Forli (IT)

(72) Inventor: Fausto Martoni, Forli (IT)

(73) Assignee: VALLI S.R.L., Forli (IT)

( * ) Notice: Subject to any disclaimer, the term of this patent is extended or adjusted under 35 U.S.C. 154(b) by 174 days.

(21) Appl. No.: 18/646,301

(22) Filed: Apr. 25, 2024

(65) Prior Publication Data

US 2024/0365756 A1  Nov. 7, 2024

(30) Foreign Application Priority Data

May 2, 2023  (IT) .................. 102023000008610

(51) Int. Cl.
  *A01K 31/16* (2006.01)
(52) U.S. Cl.
  CPC .................. *A01K 31/165* (2013.01)
(58) Field of Classification Search
  CPC .................................................. A01K 31/165
  See application file for complete search history.

(56) References Cited

U.S. PATENT DOCUMENTS

| 910,484 | A | * | 1/1909 | Bakken | .................. | A01K 31/16 119/342 |
| 5,222,459 | A | * | 6/1993 | Johnson | .................. | A01K 31/16 119/330 |
| 9,510,567 | B2 | | 12/2016 | Donker et al. | | |
| 11,553,696 | B2 | | 1/2023 | Martoni | | |
| 2020/0196576 | A1 | * | 6/2020 | Martoni | ............... | A01K 31/165 |
| 2022/0264852 | A1 | | 8/2022 | Kaiser et al. | | |
| 2022/0312744 | A1 | * | 10/2022 | Lange | .................... | A01K 31/14 |

FOREIGN PATENT DOCUMENTS

| DE | 202013102427 U1 | 8/2013 |
| EP | 1736047 A1 | 12/2006 |
| EP | 2989891 A1 | 3/2016 |

OTHER PUBLICATIONS

Translation of CN 104969880 A (Year: 2015).*
Italian Patent Office Search Report and Written Opinion for cooresponding Italian Patent Application No. IT 202300008610, report issued on Oct. 5, 2023.

* cited by examiner

*Primary Examiner* — Timothy D Collins
*Assistant Examiner* — Brittany A Lowery
(74) *Attorney, Agent, or Firm* — Howson & Howson LLP

(57) ABSTRACT

A laying nest provided with an ejection system with a particularly simple structure and operation comprises a nest floor that can rotate in two opposite directions, to get more inclined towards a collection area or towards a coop arranged on the nest side opposite to the collection area. The floor is rotatable about a pair of pivot pins arranged aligned to each other and adjacent to the coop, and each of the pivot pins is mounted slidably in a respective slot. The rotation to incline the floor towards the collection area is thus obtained by translating the pivot pins along the respective slots. The driving arrangement of the ejection system comprises traction cables guided along return pulleys arranged above the floor, whereby the ejection system has a limited footprint and is not prone to jams and malfunctions due to droppings and dirt.

14 Claims, 4 Drawing Sheets

LAYING NEST PROVIDED WITH AN IMPROVED EJECTION SYSTEM

BACKGROUND

The present invention relates to a laying nest which finds application in poultry farms, e.g., in laying hen breeding farms. More particularly, the present invention relates to a laying nest provided with an improved ejection system.

Poultry farms for laying hens are known in which hens are housed in cages or coops with egg-laying nests. These laying nests are usually arranged slightly inclined towards a collection area, which is arranged on the opposite side of the laying nests from the coops and is inaccessible to the hens, and in which a conveyor belt runs. In this way, the laid eggs can be transferred from the laying nests to the conveyor belt to be conveyed to the different stages necessary for their packaging.

While on one hand it is desirable for hens to stay in the laying nest area during the day and lay their eggs in that nest, on the other hand it is equally preferable to avoid them staying in the laying nest area during the night. For this reason, ejection systems have been developed to force hens out of laying nests.

Ejection systems are known in which a turntable hinged above the laying nest is used to push the hens out of the laying nest. Such an ejection system is described, for example, in U.S. Pat. No. 9,510,567.

However, these ejection systems have a number of drawbacks, the most disadvantageous of which is that they are complex and bulky. Furthermore, the risk of the plates injuring the hens when pushing them out of the nests cannot be excluded.

Ejection systems are also known in which the floor of the laying nests is hinged at the side next to the coop (i.e., the side opposite the collecting area) and can be rotated until the inclination of the floor becomes such that the hens are induced to leave the laying nest. In particular, the floor can be rotated until it assumes a substantially vertical position, forcing the hens away from the laying nest. Such an ejection system is described, for example, in EP 2,989,891.

This second type of ejection system, however, is also not free from drawbacks. Firstly, it should be taken into account that under normal conditions, the floor of the laying nest is only slightly inclined towards the collection area. In particular, according to current welfare regulations for farm animals in EU countries, the maximum inclination allowed for the floor is 10° to 15°. As a result, it is possible that some of the laid eggs will not roll towards the collection area. In this case they will be ejected from the nest together with the hens and break inside the coop.

Secondly, in ejection systems of this type, rotation of the floor is usually achieved by using a rack-and-pinion drive system. Such drive systems are subject to the risk of jams and malfunctions; what is more, this risk is exacerbated by the fact that droppings and dirt may be present in the environment in which they operate.

EP 3,678,477, in the name of the Applicant, describes a laying nest provided with a floor which, starting from a basic position in which it is substantially parallel to the ground or slightly inclined towards the collection area, can be rotated in two opposite directions. In particular, at first the floor can be rotated in a first direction to get more inclined towards the collection area and ensure that all the laid eggs are removed, and then it can be rotated in a second direction to get inclined towards the coop and thus expel the hens out of the nest.

To achieve this result, the floor of the laying nest is rotatable about a first pivot pin adjacent to the collection area and a second pivot pin adjacent to the coop, and the laying nest comprises a mechanism that can act alternately to push the side of the floor adjacent to the coop to cause rotation thereof about the first pivot pin or to push the side of the floor adjacent to the laying area to cause rotation thereof about the second pivot pin.

This solution, too, is not free from drawbacks and is susceptible to improvements.

Firstly, although the pushing mechanism can be arranged below the laying nest in order not to take up space inside the laying nest, the mechanism still has a considerable footprint.

Secondly, in order to be able to exert a thrust onto two opposite sides of the floor of the laying nest, this mechanism needs to have a complex structure consisting of numerous components or it needs to comprise mutually cooperating components having a complex shape.

U.S. Patent Application Publication No. 2022/0264852 A1 describes a bird nest comprising a nesting enclosure, a movable floor and a floor movement mechanism. The nest floor is mounted within the nesting enclosure and over the floor movement mechanism. The floor movement mechanism comprises a driveshaft and at least one floor actuation member coupled to the driveshaft and rotatable by the driveshaft to move the nest floor.

In this case, too, the floor movement mechanism is remarkably bulky and has a complex structure. Furthermore, since it is arranged under the nesting enclosure, its operation is prone to jams and malfunctions due to droppings and dirt falling from the enclosure above.

A laying nest comprising movable floor and a floor movement mechanism with similar structure is also described in DE 202013102427 U. The movement mechanism described in this document has similar drawbacks in terms of footprint, complexity and risk of jams and malfunctions.

EP 1,736,047 discloses a laying nest, in which closing of the nest is controlled in such a way that not only can the nest be closed, but at the same time it is ensured that the eggs still present in the nest are removed from the nest before the nest is closed. To this aim, the nest floor is pivotally hinged at the floor side facing the exit provided for the hens to exit the nest, and the nest is equipped with a floor lifting system mounted eccentrically (in an offset manner) relative to the floor pivot axis.

The need to apply the lifting force in an offset manner relative to the pivot axis results in significant limitations to the efficiency and versatility of the floor movement system.

The object of the present invention is therefore to provide a laying nest provided with an improved ejection system, having a particularly simple structure and operation and provided with a driving arrangement that is reliable and has a limited number of components as well as a limited footprint.

This and other objects are achieved with the laying nest as claimed in the appended claims.

SUMMARY

The floor of the laying nest according to the present invention can rotate in two opposite directions, starting from a basic position in which it is substantially parallel to the ground or slightly inclined towards the collection area, so that is can be rotated in a first direction to get more inclined towards the collection area and guarantee that all the laid eggs are removed, and subsequently rotated in a second opposite direction to get sensibly inclined towards the coop and thus force hens out of the nest.

According to the invention, the floor of the laying nest is rotatable about a pair of pivot pins arranged aligned to each other and adjacent to the coop, and each of the pivot pins is mounted in a corresponding slot extending in a direction substantially perpendicular to the ground.

When the floor of the laying nest is in the basic position, the pivot pins are at the lower ends of the corresponding slots.

By translating the pivot pins upwards along their respective slots, up to the upper ends of these slots, it is possible to achieve lifting of the side of the laying nest floor adjacent to the coop (whereas the opposite side adjacent to the collection area stands still) and, accordingly, rotation of the laying nest floor in the first direction.

Rotation of the laying nest floor in the second direction, instead, is achieved by rotating the floor about the pivot pins in such a way as to bring it to a strongly inclined position relative to the ground.

According to the invention, the driving arrangement for the ejection system comprises a pair of traction cables arranged at opposite sides of the laying nest and secured, at one end, to the side of the laying nest floor adjacent to the collection area, so that by tensioning the traction cables the floor can be rotated in the second direction to get inclined towards the coop, and by releasing the traction cables the floor can be rotated in the opposite direction to bring it back to the basic position.

In a particularly preferred embodiment of the invention, each of the traction cable is also connected to a respective pivot pin by means of return pulleys, whereby the traction cables also control movement of the pivot pins along their respective slots.

Thanks to this configuration, the driving arrangement for the ejection system of the laying nest according to the invention has a simple structure and comprises a limited number of components.

In addition, the driving arrangement does not sensibly take up the volume of the laying nest occupied by the hens.

Finally, still thanks to this configuration, the driving arrangement is protected against the risk of jams and malfunctions due to droppings and dirt that may present on the floor of the laying nest and fall into the space thereunder.

BRIEF DESCRIPTION OF THE DRAWINGS

Further features and advantages of the present invention will become more evident from the ensuing detailed description of a preferred embodiment of the invention, given as a non-limiting example with reference to the annexed figures, in which.

DETAILED DESCRIPTION

Figure 1A:
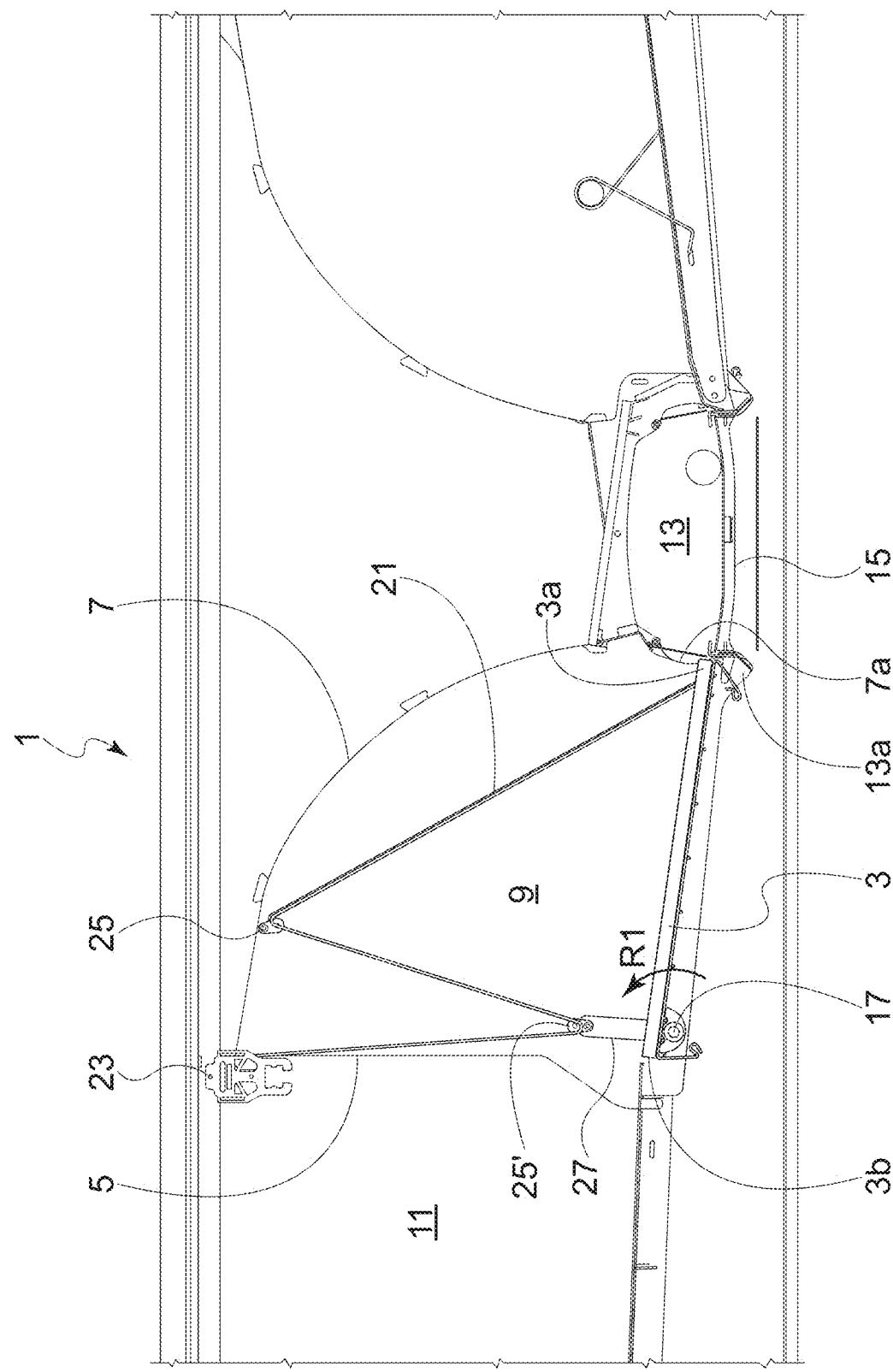
FIGS. 1a-1d show, in schematic, cross-sectional views, the laying nest according to the invention, in four different configurations.

FIGS. 1a-1d schematically show a laying nest 1 according to the invention. The nest 1 comprises a floor 3, a ceiling and side walls including a first side wall 5 adjacent to the space of a coop 11 for laying hens and comprising an entry opening for allowing the laying hens to enter and exit the laying nest, and a second side wall 7 opposite to the first side wall 5 adjacent to the space of a collection area 13 for collecting the laid eggs and comprising, in its lower portion, a discharge opening 7a for allowing transfer of the laid eggs from the laying nest 1 to the collection area 13.

In the illustrated embodiment the second side wall 7 is curved, for reasons that will become apparent below; however, other forms of the laying nest 1 are also possible.

At the bottom of the collection area 13 there is provided a conveyor belt 15 which carries the eggs coming from the laying nest 1 to the following stages of the packing machine.

According to the invention, the floor 3 of the nest 1 is provided rotatable in a first direction to get more inclined towards the collection area 13 and ensure that all the laid eggs are removed, and is also rotatable in a second, opposite direction to get sensibly inclined towards the coop 11 and thereby force the hens out of the nest.

In order to achieve the possibility of rotating in these two opposite directions, the floor 3 of the nest 1 is rotatably mounted to a pair of pivot pins 17 which are aligned along a rotation axis R1 provided parallel to the first side wall 5 and adjacent thereto. Preferably, each of these pivot pins 17 is integral with a plate 17a which has a wall contacting and abutting the lower face of the floor 3 of the nest 1.

In the example shown in the Figures, each of the pivot pins 17 is integral with a semicircular plate 17a whose flat wall contacts and abuts the lower face of the floor 3 of the nest 1. In addition, these pivot pins 17 are arranged in corresponding slots 19, formed in a third side wall 9 of the nest 1 extending between these first and second side walls, and in a fourth side wall (not visible in the Figures) of the nest 1 extending between the first and second side walls and opposite to the third side wall 9, respectively, the slots extending in a substantially vertical direction.

Thanks to this configuration, as explained in detail below, the floor 3 of the laying nest 1 can be rotated in both directions, i.e., both to get inclined towards the collection area 13 and to get inclined towards the coop 11.

In FIG. 1a, the laying nest 1 is shown in a first configuration or basic configuration, which corresponds to the configuration in which the laying hens have access to the nest and can lay eggs in the nest.

In this first configuration, the floor 3 of the nest 1 can be essentially horizontal (i.e., parallel to the ground) or—as shown in FIG. 1a—slightly inclined towards the collection area 13, with an inclination angle not exceeding 15°. In these conditions, the inclination of the floor 3 of the laying nest 1 is not annoying to hens, which can stay in the nest and lay eggs therein.

In this first configuration, the side 3a of the floor 3 of the nest 1 facing the collection area (i.e., facing the second side wall 7 of the nest 1) rests on an abutment edge 13a formed in the collection area 13, and the pivot pins 17 are at the lower ends of the respective slots 19.

Once the hens have laid their eggs and have to be expelled out of the laying nest 1, the floor 3 of the nest can initially be rotated in a first direction 3—clockwise in the Figures— to get more inclined towards the collection area 13. In this way, any laid eggs that may still be present on the floor 3 of the laying nest roll towards the discharge opening 7a of the second side wall 7 and, through this opening, into the collection area 13.

Figure 1B:
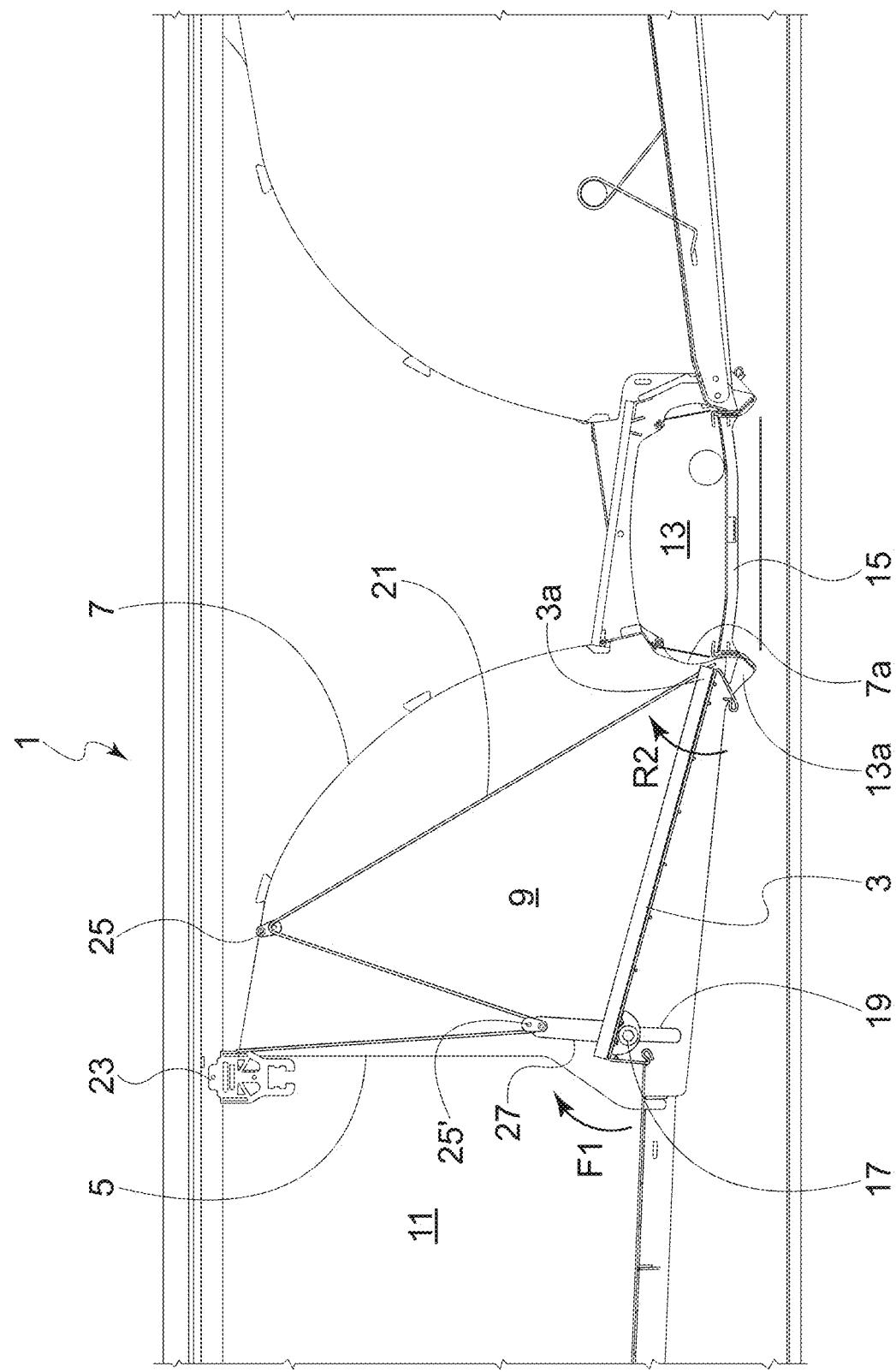

To cause such rotation, the pivot pins 17 are translated along the respective slots 19 until they are brought to the upper ends of the slots, in the configuration shown in FIG. 1b.

As can be seen by comparing FIG. 1a and FIG. 1b, translation of the pivot pins 17 along their respective slots 19 leads to a lifting of the side 3b of the floor facing the coop 11 (i.e., facing the first side wall 5 of the nest 1). By lifting the side 3b of the floor 3 facing the coop 11 while the side 3a of the floor 3 facing the collection area 13 is kept standing still (by the force of gravity) on the abutment edge 13a, rotation of the floor 3 of the nest 1 about a rotation axis R2 parallel to the second side wall 7 of the nest 1 and adjacent thereto is achieved. In other words, the floor 3 of the nest 1 will rotate in the first direction (arrow F1) to get more inclined towards the collection area, and the amount of rotation will be determined by the extension of the slots 19.

In principle, an inclination of 20°-30° is, on one hand, sufficient to guarantee that all the eggs are removed and, on the other hand, sufficiently small not to cause undue discomfort to the hens present in the nest.

Figure 1C:
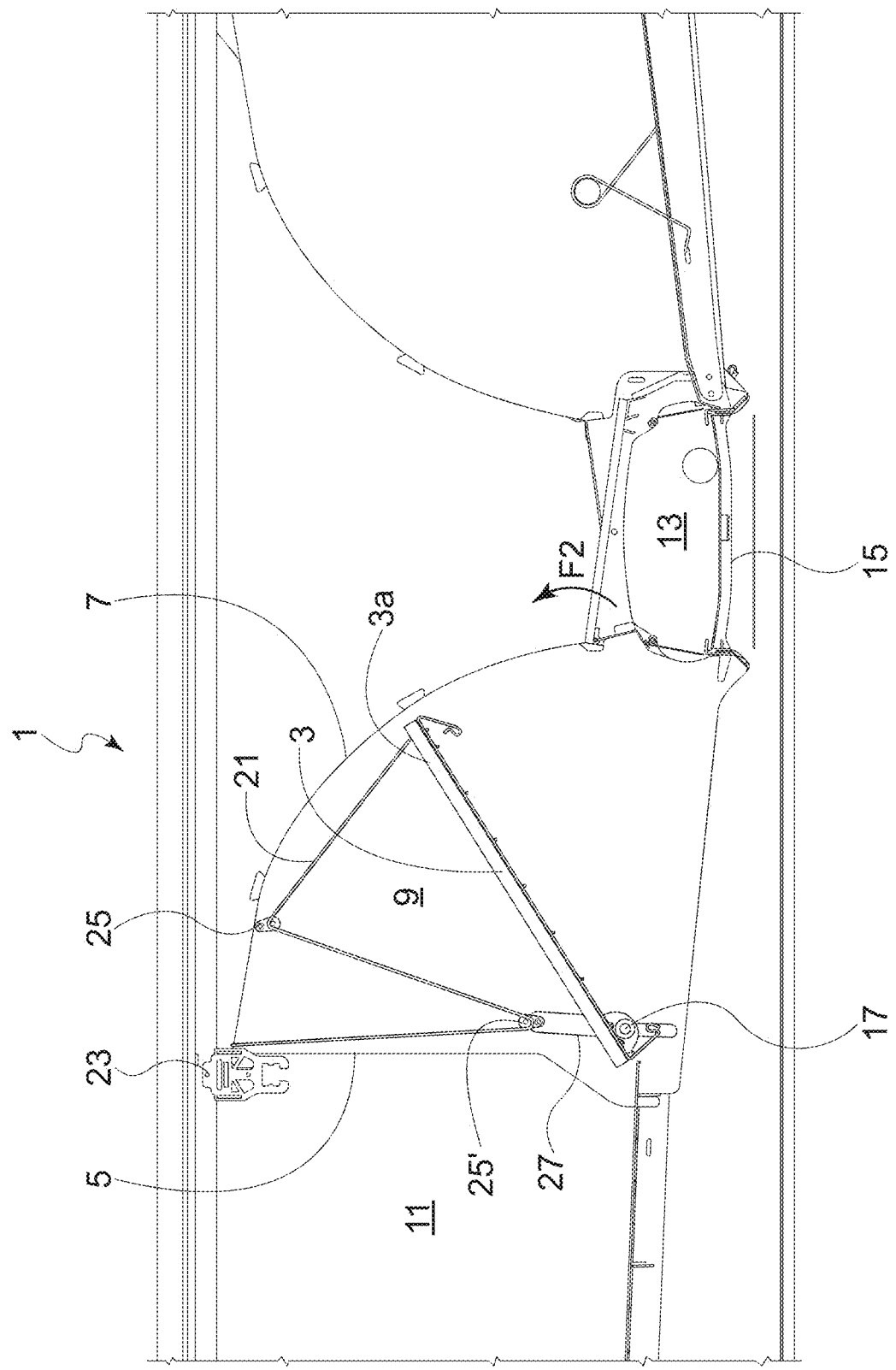

Subsequently, the floor 3 of the laying nest 1 is rotated about the pivot pins 17 in a second direction (arrow F2) opposite to the first direction—i.e., counterclockwise in the Figures—to bring it into the configuration of FIG. 1d. FIG. 1c shows an intermediate configuration between the basic configuration of FIG. 1a and the configuration of FIG. 1d.

Figure 1D:
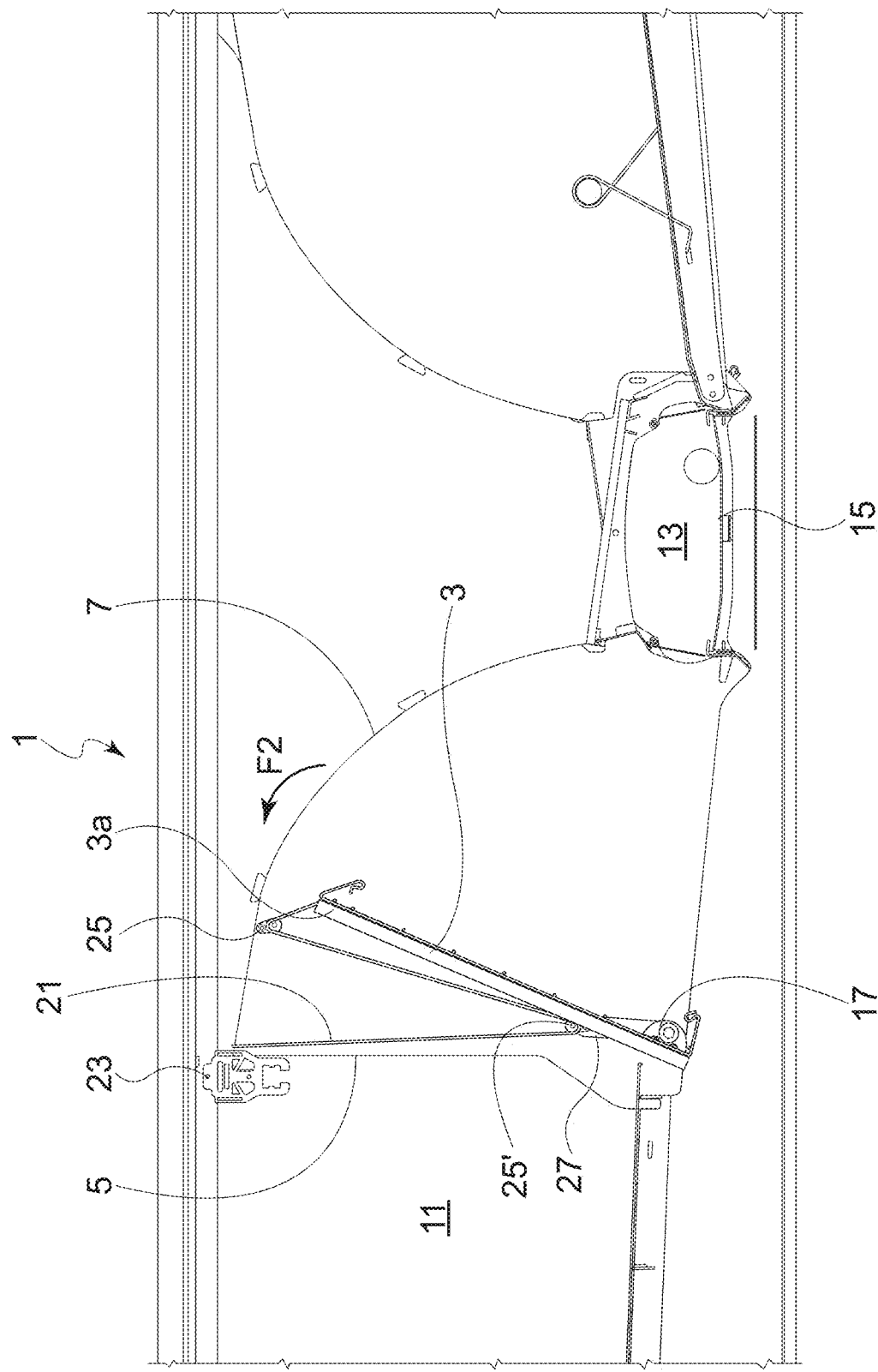

In the configuration of FIG. 1c and, even more pronouncedly, in the configuration of FIG. 1d, the floor 3 of the nest 1 is inclined towards the coop 11 rather than towards the collection area 13, so as to invite the hens to leave the laying next and re-enter the coop 11. As clearly visible in FIG. 1c and FIG. 1d, thanks to the fact that the second side wall 7 of the laying nest 1 is curved, the side 3a of the floor 3 facing the second side wall 7 always remains adjacent to the second side wall 7 while the floor 3 rotates about the pivot pins 17. In this way, it is possible to prevent the hens from getting stuck between the floor 3 and the second side wall 7 and get injured.

In the configuration of FIG. 1d, the floor 3 of the laying nest 1 is strongly inclined towards the coop 11 and substantially closes the entry opening of the first side wall 5, whereby the hens are forced to leave the nest and prevented from re-entering it as long as the floor 3 is kept in this position.

When it is desired that the hens be allowed to access again the laying nest, the floor 3 of the nest can again be brought into the basic configuration of FIG. 1a, by rotating it in the opposite direction (clockwise in the Figures) about the pivot pins 17.

As shown in FIGS. 1a-1d, the laying nest 1 according to the invention has a particularly advantageous driving arrangement: this driving arrangement comprises a pair of traction cables 21 (only one of which is visible in the Figures) arranged at the third side wall 9 and the fourth side wall of the nest 1, respectively.

The traction cables 21 are secured, at a first end, to the side 3a of the floor 3 facing the collection area 13, whereas the opposite end of the traction cables 21 is secured to a traction device 23 located at the top of the first side wall 5 of the nest 1.

These traction cables can be made, for example, as winches 23. These winches 23 make it possible to control rotation of the floor 3 of the nest 1 about the pivot pins 17: by winding up the traction cables 21 about the winches 23 it is possible to tension these cables to cause rotation of the floor 3 in the second direction to incline it towards the coop 11 (FIGS. 1c, 1d); conversely, by unwinding the traction cables 21 from the winches 23 it is possible to release these cables to cause rotation of the floor 3 in the opposite direction to bring it back to its basic configuration (FIG. 1a).

In the preferred embodiment shown in FIGS. 1a-1d, the traction cables 21 do not extend linearly between the winches 23 and the side 3a of the floor 3 facing the collection area 13. Instead, return pulleys 25 are provided at the third side wall 9 and the fourth side wall of the nest 1, respectively, and each traction cable 21 follows a path determined by the succession of these return pulleys.

Thanks to this provision, the traction cables 21 can also control translation of the pivot pins 17 along the respective slots 19.

To this aim, for each traction cable 21 a pulley 25' is movably located on the corresponding side wall and is connected to the respective pivot pin, for example, by means of cords 27 or by means of a rigid plate. In this manner, by tensioning the traction cables 21 it will be possible to cause an upward movement of the movable pulley 25', which—by means of the cords 27—will entrain the corresponding pivot pin 17 upwards and up to the upper end of the corresponding slot 19.

Each movable pulley 25' is preferably arranged aligned with the corresponding pivot pin 17, i.e., adjacent to the first side wall 5, and above the pivot pin.

The basic configuration shown in FIG. 1a corresponds to the situation in which the traction cables are entirely released.

If the winches 23 are operated to wind the traction cables 21 and tension them, this will at first result in an upward movement of the movable pulleys 25', with consequent upward movement of the pivot pins 17 along the respective slots 19 until the configuration shown in FIG. 1b is reached. At this point, if the winches 23 are again actuated to wind the traction cables 21, the movable pulleys 25' can no longer move upwards, because they are constrained to the pivot pins (which by now are at the upper ends of the slots 19). Accordingly, the winding of the traction cables 21 will result in the rotation of the floor 3 of the nest 1 towards the coop 11, in the configuration shown in FIG. 1c and then in the configuration shown in FIG. 1d.

Starting from the configuration 1d, by releasing the traction cables 21 it will be possible to cause the movably pulleys 25' to move downwards and the floor 3 to rotate in the opposite direction until it returns to the basic configuration of FIG. 1a.

It will be evident to the person skilled in the art that a driving arrangement of the type described above has clear advantages.

First of all, such driving arrangement makes it possible, with an extremely limited number of components, to achieve both rotation of the floor 3 of the laying nest 1 about the pivot pins 17 and translation of the pivot pins along the respective slots 19.

Secondly, the overall amount of space occupied by the traction cables 21 and the return pulleys 25 is very limited, whereby the driving arrangement takes up a very limited part of the volume of the laying nest 1 available to the hens.

Thirdly, it is possible to arrange the return pulleys 25 (and therefore the path of the traction cables 21) at a certain height above the floor 3 of the nest 1. In this manner, it is possible to prevent droppings and dirt present on the floor 3 of the nest from causing jams and malfunctions of the driving arrangement.

From the above description, it will be apparent to the person skilled in the art that the invention makes it possible to achieve the objects set forth above, by allowing to provide a laying nest with an improved ejection system compared to known systems.

It will also be apparent to the person skilled in the art that the embodiment described and shown above is given merely by way of example and that numerous variations and modifications are possible without leaving the scope of protection as defined by the appended claims.

The invention claimed is:

1. A laying nest, comprising: a floor and side walls, including a first side wall comprising an entry opening, a second side wall, opposite to the first side wall and comprising a discharge opening, a third side wall and a fourth side wall that are opposite to each other and extend between the first and second side walls, wherein the floor has at least a side adjacent to the first side wall and a side adjacent to the second wall, wherein the floor is arranged rotatable about a first rotation axis parallel to the first side wall and adjacent thereto, as well as about a second rotation axis arranged parallel to the second side wall and adjacent thereto, wherein the floor is mounted to a pair of pivot pins arranged aligned along the first rotation axis, and wherein the pivot pins are mounted slidably in slots provided in the third wall and the fourth wall, respectively, and extending in a vertical direction, wherein the rotation of the floor about the second rotation axis is obtained by translation of the pivot pins along the slots, wherein the laying nest comprises a driving arrangement to rotate the floor about the pivot pins, wherein the driving arrangement comprises a pair of traction cables arranged at the third side wall and the fourth side wall of the nest, respectively, wherein a first end of each of the traction cables is secured to the floor at the side of the floor facing the second side wall, and wherein the opposite end of each of the traction cables is secured to a respective traction device actuatable for tensioning or releasing the traction cables.

2. The laying nest of claim 1, wherein the driving arrangement comprises return pulleys at the third side wall and the fourth side wall of the nest, respectively, and wherein each of the traction cables follows a path determined by the sequence of the return pulleys.

3. The laying nest of claim 2, wherein the return pulleys are arranged above the floor.

4. The laying nest of claim 1, wherein the driving arrangement, besides controlling rotation of the floor about the pivot pins, controls translation of the pivot pins along the slots.

5. The laying nest of claim 2, wherein the driving arrangement, besides controlling rotation of the floor about the pivot pins, controls translation of the pivot pins along the slots, and wherein the driving arrangement comprises, for each of the traction cables, a movable pulley connected to the respective pivot pin.

6. The laying nest of claim 5, wherein, for each of the traction cables, the movable pulley is arranged adjacent to the first side wall and above the respective pivot pin.

7. The laying nest of claim 5, wherein each movable pulley is connected to the respective pivot pin by means of cords.

8. The laying nest of claim 5, wherein each movable pulley is connected to the respective pivot pin by means of a rigid plate.

9. The laying nest of claim 6, wherein each movable pulley is connected to the respective pivot pin by means of cords.

10. The laying nest of claim 6, wherein each movable pulley is connected to the respective pivot pin by means of a rigid plate.

11. The laying nest of claim 1, wherein the traction devices are winches.

12. The laying nest of claim 1, wherein each of the pivot pins is integral with a corresponding plate which has a wall contacting and abutting the lower face of the floor.

13. The laying nest of claim 1, wherein the floor rotates by an angle between 5° and 20° about the second rotation axis when the pivot pins translate from the lower ends of the slots to the upper ends of the slots, or vice versa.

14. The laying nest of claim 1, wherein the second side wall has a curved profile substantially coinciding with a circumference arc drawn on the side of the floor adjacent to the second side wall during rotation of the floor about the first rotation axis.

* * * * *